April 4, 1961
C. M. WILLIAMS
2,978,275
FARM VEHICLES
Filed July 13, 1954
4 Sheets-Sheet 1
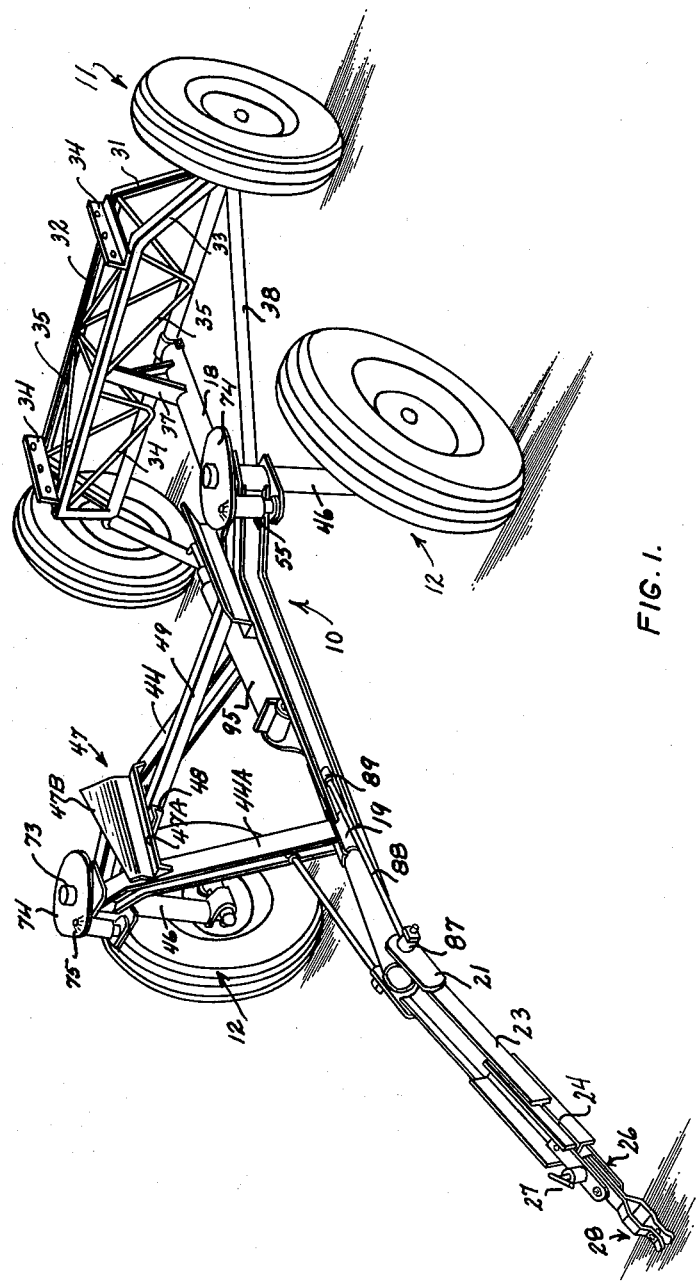
FIG. I.
INVENTOR
Chester M. Williams April 4, 1961  C. M. WILLIAMS  2,978,275
FARM VEHICLES Filed July 13, 1954

INVENTOR
Chester M. Williams

INVENTOR
Chester M. Williams

United States Patent Office 2,978,275
Patented Apr. 4, 1961

2,978,275

FARM VEHICLES

Chester M. Williams, Toulon, Ill.

Filed July 13, 1954, Ser. No. 442,977

3 Claims. (Cl. 298—22)

The invention relates to a highly maneuverable vehicle chassis, and, more particularly to a vehicle for the transportation and dumping of materials on farms and the like wherein the vehicle is of the so-called towed type and but a single horizontally disposed pivotal connection is provided between the vehicle and its towing unit for steering purposes. It is to be understood that the chassis is not thus limited in scope, and, could be used for other purposes, such as house trailers.

Most trailers use various types of tongue-steered front wheels necessitating two horizontal pivot connections, one of which is located at the point of connection to the towing unit, and, the other at the point of connection to the trailer providing the steering pivot of the front wheels. When "backing" such a trailer, the front wheels reverse the directional line of travel thereby making it somewhat difficult to reverse the trailer into the desired or the proper position.

With this invention, the single pivot provided permits the reverse directional line of travel to be transmitted to the rear wheels thereby enabling easy reverse maneuverability.

One of the important objects of the invention is to provide a vehicle wherein the front casters are independently supported by the vehicle chassis so that the casters are free to rotate in any direction in which the vehicle is moved in the reverse direction, or, the casters will turn and follow the direction in which the connected power source is applied.

A further object of the invention is to provide a stabilizer for each of the casters which will control "shimmy" and undesirable counter-steering effects caused by the travel of the vehicle over terrain of varying contours, and, this is especially true at high speeds.

Another object of the invention is to provide a chassis for receiving various types of haul boxes wherein the rear bolster receives and supports the rearmost portion of the box and the bolster is also capable of vertical oscillation with respect to the front bolster to allow of its alignment with the front bolster.

And another object is to provide a trailer wherein the rear bolster pivots about the rear axle of the trailer so that when a raising action is applied to the front end of the haul box, either mechanically or hydraulically, the box will pivot upwardly about the rear axle to "dump" the load.

Still another object of the invention is to provide a trailer wherein the haul box is supported at four points and the front end of the trailer is supported and steered by two casters.

Another object of the invention is to provide a lifting assembly for the haul box which is adjustably mounted on the chassis keel pipe to accommodate assemblies of varying sizes and strokes, with the pivotal connection of the assembly to the keel pipe being lower than the connection of the assembly to the forward portion of the haul box so that an angular thrust can be applied to the forward portion of the box when the assembly is activated.

With the above and other important objects in view, the invention consists in the details of structure, and in the arrangement and combination of parts to be hereinafter more fully described and claimed.

Figure 1 is a view in perspective of the trailer.

Figure 3:
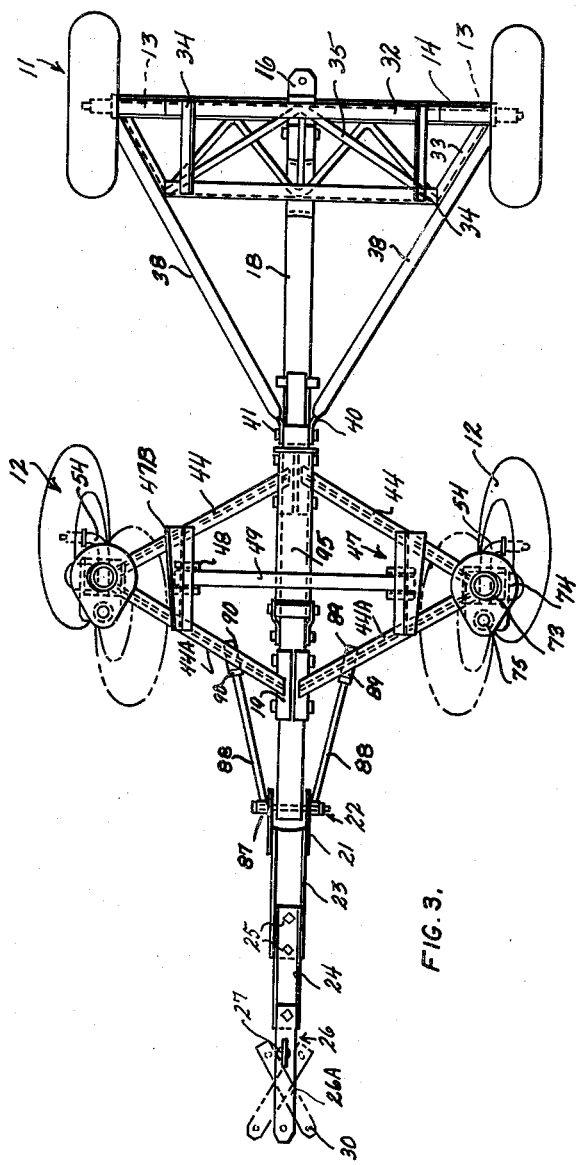
Figure 3 is a top plan view of the trailer shown in Figures 1 and 2.

In the drawings, there is shown a framework 10 having a pair of rear wheels 11 and front casters 12 for steering the vehicle or trailer. The rear wheels 11 are suitably supported by the ends of an axle 13 which axle extends through a pivot sleeve 14. At approximately the mid-point of the sleeve 14 is fixed and extends forwardly therefrom, a keel support stub 15 and a towing lug 16 extends rearwardly from the sleeve 14. The support stub 15 is fitted within a keel pipe extension 17 which telescopes within the keel pipe 18. The forward end of the keel pipe 18 is provided with a connection segment 19 in the nature of a split sleeve which is secured by means of nut and bolt assemblies 20.

A pair of tongue beam plates 21 are pivoted to the extreme forward end of the keel pipe as shown at 22 with the free ends of the plates connected to a tongue beam 23. The beam 23 is of channel section, and, a tongue extension channel 24 is adjustably supported by the beam 23 by bolt and nut units 25 lodged in the apertures provided in the beam and the extension 24. A tongue extension plate 26 is fixed to the free end of the extension channel 24, such plate being defined by two vertically spaced elements 26A, with the uppermost element supporting a spring loaded pin unit 27, to be later described. A hitch yoke 28 is pivotally connected to the outer end of the extension plate 26 as shown at 29 with the yoke having apertures 30 therein for connection to the towing vehicle.

Thus, it will be seen that the tongue assembly has but a single horizontal pivot, namely, the point 22.

Figure 2:
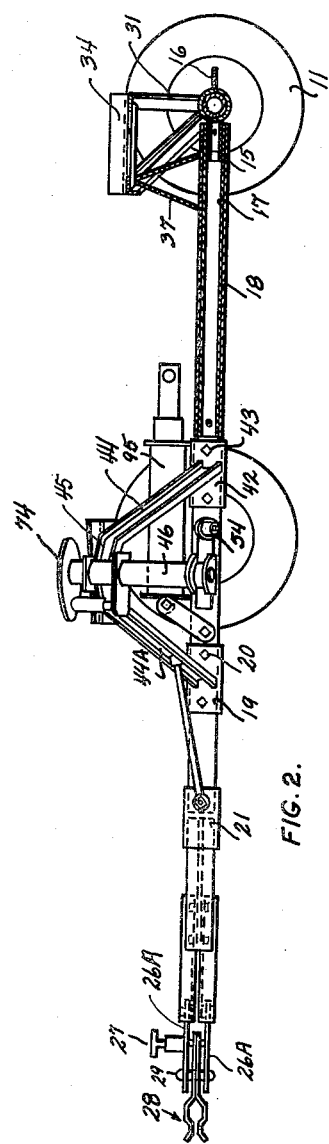
Figure 2 is a view in side elevation, and, partly in cross-section of the trailer shown in Figure 1.

As depicted in Figures 2 and 3, at each end of the sleeve 14, a support 31 extends upwardly and inwardly with the lower end of each support secured to the sleeve. A horizontal piece 32 joins the supports 31 to form in effect an arched member which is parallel to the sleeve 14. Also secured to the sleeve at each end and extending forwardly and inwardly at an angle are supports 33 which are joined at their upper ends by a horizontal member. It will be seen that the horizontal members fall in the same plane and platform stringers 34 of angle section are secured to such horizontal supports in a suitable manner. The haul box (not shown) is adapted to be affixed to the stringers 34.

The horizontal members are supported by vertical truss bars 35 and horizontal truss bars 36 while a brace plate 37 is provided between the front horizontal member and the keel pipe 18. The aforedescribed assembly constitutes the rear bolster of the trailer. The bolster with the haul box carried thereby can be moved to various angular positions to allow of the dumping of the contents of the box, as will hereinafter be more fully set forth.

A pair of braces 38 of tubular formation extend from the rear axle in converging relation, and, are secured to the keel pipe 18 at their forward ends. More specifically, at the rearward end of each brace 38 is fitted a collar 39 which embraces the axle, and, at the forward end, the brace is provided with a connection 40 which is attached to the keel pipe by means of a nut and bolt assembly 41.

Figure 4:
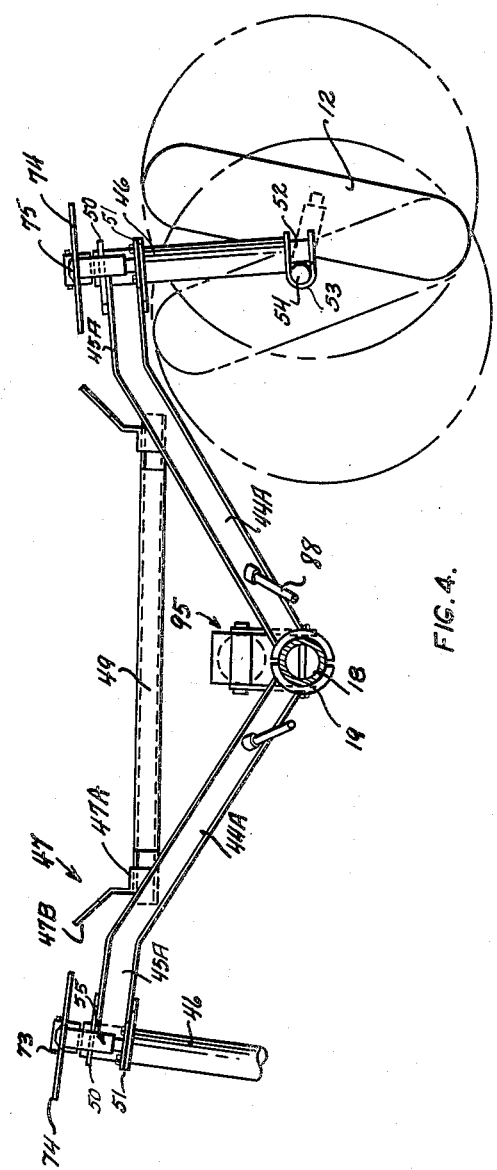
Figure 4 is a front elevational view of the trailer depicted in Figures 1 and 2.
Figures 5, 6:
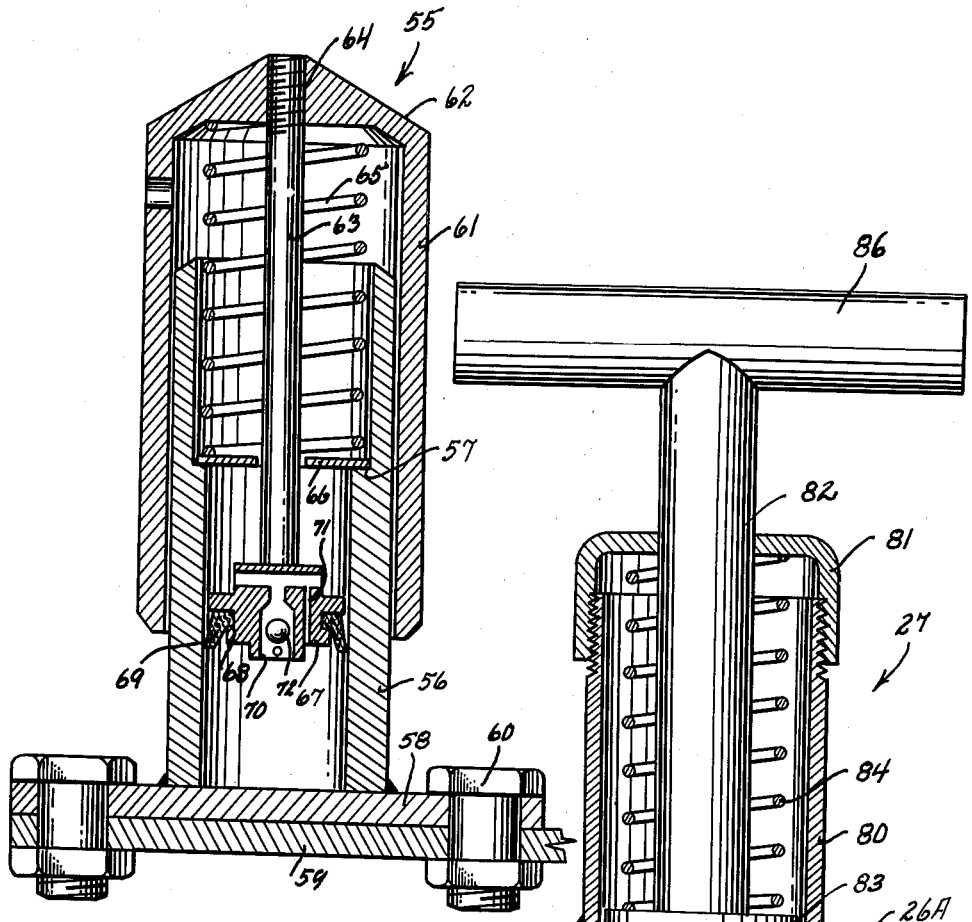
Figure 5 is a vertical sectional view of the hydraulic stabilizer.
Figure 6 is a view in detail of the spring loaded pin unit.

Mounted on the keel pipe 18 forwardly of the connections 40, is a split sleeve 42 having nut and bolt assemblies 43 for securing the sleeve to the keel pipe. Attached to the sleeve 42 in any convenient manner, and, inclined forwardly and outwardly are a pair of braces 44 of I-section. The upper or free end of each brace 44 is displaced angularly as at 45 and is secured to a spindle housing 46 of the front casters as can be seen in Figure 4. A similar pair of braces 44A are inclined rearwardly and outwardly with angular portion 45A secured to the respective spindle housing 46. The opposite ends of the braces 44A are connected to the split sleeve segment 19.

A pair of front bolster supports 47 are welded or otherwise secured to the braces 44 and 44A at a position to be in registry with the stringers of the rear bolster, and the support 47 includes a horizontal portion 47A and an angular wing portion 47B. Affixed to each horizontal portion 47A are spaced angle-section hangers 48 to which the ends of a bolster tube 49 are secured by nut and bolt assemblies passing through aligned apertures in the hangers and the tube. The supports 47 serve to support the forward portion of the haul box.

The braces 44 and 44A are fixed to the spindle housings 46 between upper and lower gussets 50 and 51 and suitably journalled within each housing 46 is a spindle 52. The spindle is of greater length than the housing 46 so that a portion of the spindle extends beyond the upper and lower ends of the housing. A yoke 53 is anchored to the projecting portion of the spindle at the lower end and supports a curved spindle element 54 to which the caster 12 is mounted. As depicted in Figure 4, each housing 46 is supported so that the center line of the housing and the center line of the caster including the tire are at an angle of approximately 15 degrees. More specifically, the center line of the spindle and the vertical plane extending through the element 54 meet at a point below the surface of the ground. The part of the spindle on which the caster rotates is suspended from the center line of the housing 46 and is thus held in parallel alignment in relation to caster rotation to ground travel during movement of the trailer in any direction.

Hence, the center line of each housing and the center line through the camber of the associated caster merge at tire center with the steering spindle axis and the caster axis suspended at the end of a common spindle so that the center line of the axis portion of the housing end and the perpendicular line to the center point of the axis portion of the housing end are apart in relation to a perpendicular line to the ground giving each caster independent 360 degree ground friction steering action. Thus, the front casters are free to follow the path of friction with the ground.

As previously indicated, when the trailer is moving over uneven or rough terrain, the casters are subjected to "shimmy" et cetera, and, to overcome this problem, a hydraulic stabilizer 55 is associated with each caster 12.

The stabilizer 55 includes an open ended fluid containing barrel 56 with the upper end thereof of greater inside diameter than the lower end to provide a shoulder 57 at about the mid portion of the barrel. The lower end of the barrel is secured to a base 58 to form a leakproof joint, and the base in turn is fixed to a brace 59 by nut and bolt assemblies 60 passing through aligned openings in the base and brace. The brace in turn is secured to the spindle housing 46. In fact, the base could be attached to the lower gusset 51.

Mounted about the barrel 56 is a hollow piston pawl 61 having a tapered or conical end portion 62 and the pawl is of such inside diameter that it may have free vertical sliding movement on the barrel. A piston rod 63 is threaded at its upper end to the center of the conical end 62 as at 64. A compression spring 65 surrounds the rod 63 with the upper end thereof bearing against the inner face of the conical end portion and the lower end against a washer 66 disposed on the shoulder 57 of the barrel. The spring 65 normally urges the piston pawl upwardly.

A piston 67 is carried by the lower end of the rod 63 and includes a peripheral groove 68 in which a flexible piston ring 69 is lodged, the ring being self sealing on the downward stroke of the rod.

A circular taper shouldered valve opening 70 is formed through the center of the piston, and, a separate by-pass opening 71 of lesser diameter is also provided in the piston. A ball 72 of lesser diameter than the lower zone of the opening 70 but of greater diameter than the upper zone of such opening is disposed within the opening. The ball is adapted to seat itself against the tapered shoulder of the valve opening when forced upwardly by the fluid on the downward stroke of the piston.

A horizontally arranged key projects through the valve opening 70 at a point below the ball 72 to retain the ball within the opening 70 yet permit limited vertical movement of the ball in such opening.

A housing member 73 is removably secured to the upper projecting portion of the spindle 52, and, a stabilizer plate 74 is fixed to the housing member 73. The plate 74 is formed with a tapered or conical seat 75 at a point adjacent its periphery and the seat conforms to the configuration of the tapered or conical end 62 of the piston pawl. This seat is synchronized to receive the tapered end 62 when the wheel or caster spindle is in a direct, forward running position. When the downward movement of the piston applies pressure to the ball 72 forcing the ball against the shouldered seat, the fluid flow is arrested through the opening thereby leaving only the by-pass opening 71 for the fluid pressure to escape through the piston 67 which controls the downward stroke to a slow, steady movement in relation to the consistency of the fluid. The size of the by-pass opening plus the above effecting steady steering of the caster spindle in the direct forward position until the tapered end 62 is disengaged from its seat 75, at which time the spindle is free to rotate quickly until reengaged in the seat 75 by the rapid upward movement of the piston pawl through the action of the spring 65 and the release of the ball from the shouldered seat on the upward stroke of the piston.

Also, it will be noted that the wings and the supports for the front bolster define surfaces which extend beyond the center point of the front casters 12 in opposite directions. This arrangement is deemed clear from Figure 2, and, it relieves the load leverage pivot on the frame keel and the angled wings provide self-alignment of the haul box when such box is being returned from the angled "dump" position to the level hauling or transporting position.

With respect to the pin 27, it will be observed that this pin comprises a housing 80 suitably secured to the uppermost element 26A with the open upper end of the housing being closed by a cap 81 threadedly engaging the end of the housing. A plunger body 82 is mounted within the housing and is formed with a stop flange 83 which is normally held in contact with the element 26A by spring 84 surrounding the plunger and bearing against the cap 81 and the flange 83. The plunger includes a lower end portion 85 which passes through the opening in the uppermost element 26A, an aperture in the rear area of the yoke 28 and the opening in the lowermost element 26A. The upper end of the plunger body 82 has a handle 86 by which the plunger body may be displaced upwardly to withdraw the portion 85 from the aperture in the yoke. When the end portion is lodged in the openings in the elements 26A and the aperture in the yoke, the yoke will be locked in the straight forward position and maintained in such position by the action of the spring 84. On the other hand, when the plunger body is withdrawn from such position, the yoke is free to pivot about the point 29.

Hence, from the above it will be seen that the tongue beam plates 21, the tongue beam 23, the channel 24, the plate 26, and the yoke 28 pivot vertically only on the point 22 which is the pivotal connection to the keel pipe. This provides for straight in line horizontally rigid towing connections between the trailer and the tractor with only the outermost aperture of the hitch yoke 28 which receives the hitch pin (see Figure 3) being the horizontal pivotal connection for steering purposes of the trailer. Thus, there is afforded two-wheeled trailer maneuverability of a four-wheeled vehicle.

Each end of the pivot connection 22 is provided with a truss rod sleeve 87 to which is attached, the free end of a truss rod 88. The opposite end of the truss rod 88 is threaded and extends through a pair of bevelled washers 89 carried by the forward braces 44A. A lock nut 90 engages the threaded end of the rod adjacent the outer face of each of the washers 89.

It will be seen that the horizontal pivot of the tongue unit to the chassis is well ahead of the main frame thus materially reducing the weight of the tongue unit. The truss rods provide great lateral strength for the tongue unit, and, such an arrangement is quite economical.

It will be appreciated that the haul box is secured to the rear bolster only, and, suitable means, such as a hydraulic lift unit 95 is employed to raise the front portion of the haul box to pivot the box about the rear axle for dumping. One end of the unit 95 is pivotally connected to the keel pipe between the casters, and, this pivotal connection is such that a longitudinal adjustment along the keel pipe is possible. This means that units of various sizes and of strokes can be supported by the keel pipe. Suitable means is operatively connected between the unit 95 and the front portion of the haul box to raise such portion of the box. The connection to the box is higher than the pivotal connection to the keel pipe so that an angular thrust is applied to the forward portion of the haul box when the unit 95 is activated. By proper control of the hydraulic lift, the angular position of the rear bolster can be maintained within fine limits, and, when the rear bolster is in the horizontal position, the wings on the front bolster will ensure the proper position of the forward portion of the box. Hence, the trailer chassis provides built-in self dumping features by merely adding a hydraulic unit or an equivalent mechanical device. The front end of the trailer remains on the ground or is mobile during the unloading cycle, and, this is a material improvement over standard vehicles which require a tilting of the complete chassis or the addition of a complete oscillating framework plus the lift means to accomplish the same ends.

To permit the longitudinal adjustment of the pivot connection of the hydraulic unit, a series of apertures are provided in the keel pipe, and, obviously the connection may be moved either forwardly or rearwardly of the keel pipe. This arrangement affords the best possible mechanical advantage in elevating 10, 12, 14 and 16 foot haul boxes. Of course, other means for making such adjustments can be used.

Furthermore, by having each of the front casters independently suspended from the chassis, there is afforded a free-wheeled front end thus eliminating the pivot action of the tongue on a vertical axis as is the case of tongue steered standard vehicles and enabling the trailer to be easily maneuvered, especially in the case of backing the tractor and trailer into a desired position. The stabilizers associated with the front casters function to "freeze" the casters into only a slow turn for a few degrees to eliminate "shimmy" of the casters and the "whipping" of the trailer during movement in a forward direction.

While I have described the structural members of the chassis as being of certain cross-section, it is obvious that these members can be of other types so long as the desired ends can be accomplished.

The invention is not to be confined to any strict conformity with the showing in the drawings but may be changed or modified so long as such changes or modifications mark no material departure from the salient features of the invention as expressed in the appended claims.

Having thus shown and described a preferred embodiment of the invention, what I claim as novel is as follows:

1. An independently balanced vehicle comprising a chassis, rear ground wheels journalled in the chassis, at least one front steering wheel carried by the front of the chassis, a rear bolster pivotally connected to the rear axle for vertical swinging movement, a front bolster carried by the chassis adjacent the steering wheel, means to secure a supporting body to the rear bolster, power means secured to the chassis adjacent to and below the front bolster and connected to the supporting body with the connection to the supporting body being higher than the attachment of the power means to the chassis so that when the power means applies angular thrust to the supporting body, the rear bolster swings upwardly about its pivot, and in which said rear bolster includes a tubular rear axle housing, a pair of spaced apart longitudinal arched members parallel to the housing at the bed support level and secured to the ends of the housing at a common point, and brace means extending between said housing and said longitudinal arched members.

2. The vehicle defined in claim 1 wherein the supporting body is secured to the rear bolster by a pair of angle braces carried by the longitudinal members.

3. An independently balanced vehicle comprising a chassis, rear ground wheels journalled in the chassis, at least one front steering wheel carried by the front of the chassis, a rear bolster pivotally connected to the rear axle for vertical swinging movement, a front bolster carried by the chassis adjacent the steering wheel, means to secure a supporting body to the rear bolster, power means secured to the chassis adjacent to and below the front bolster and connected to the supporting body with the connection to the supporting body being higher than the attachment of the power means to the chassis so that when the power means applies angular thrust to the supporting body, the rear bolster swings upwardly about its pivot, and in which said front bolster is provided with a pair of angular wings arranged in spaced relation to support the forward portion of the said supporting body, with such wings projecting beyond the center point, in both directions, of the steering wheel.

References Cited in the file of this patent

UNITED STATES PATENTS

| | | |
|---|---|---|
| Re. 23,459 | Budnick et al. | Feb. 12, 1952 |
| 669,118 | Kindermann | Mar. 5, 1901 |
| 769,201 | Van Blaroom et al. | Sept. 6, 1904 |
| 1,493,970 | Du Bois | May 13, 1924 |
| 1,557,195 | Clapp | Oct. 13, 1925 |
| 1,586,624 | Herrick | June 1, 1926 |
| 1,655,351 | Altgelt | Jan. 3, 1928 |
| 1,749,274 | Crisler | Mar. 4, 1930 |
| 1,779,887 | Melanson | Oct. 28, 1930 |
| 2,042,780 | Greer | June 2, 1936 |
| 2,190,300 | Van Zeeland et al. | Feb. 13, 1940 |
| 2,237,838 | McClish | Apr. 8, 1941 |
| 2,262,421 | Borden | Nov. 11, 1941 |
| 2,342,618 | Thieman | Feb. 22, 1944 |
| 2,481,948 | Pruett | Sept. 13, 1949 |
| 2,512,836 | Olson et al. | June 27, 1950 |
| 2,674,464 | Peterson | Apr. 6, 1954 |

FOREIGN PATENTS

| | | |
|---|---|---|
| 549,772 | Great Britain | Dec. 7, 1942 |
| 346,906 | Italy | Mar. 11, 1937 |